Nov. 17, 1931. A. OLIER 1,832,472
AUTOMATIC APPARATUS FOR THE CONTINUOUS EXTRACTION OF
THE SUGAR CONTAINED IN SUGAR PLANTS
Filed Feb. 18, 1928 2 Sheets-Sheet 1

INVENTOR:
André Olier
BY: Reegs, Bayes &Bakelor
ATTORNEYS

Nov. 17, 1931.  A. OLIER  1,832,472
AUTOMATIC APPARATUS FOR THE CONTINUOUS EXTRACTION OF
THE SUGAR CONTAINED IN SUGAR PLANTS
Filed Feb. 18, 1928   2 Sheets-Sheet 2
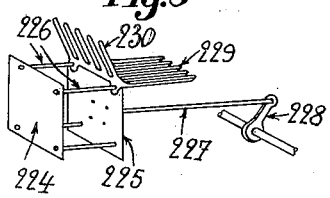
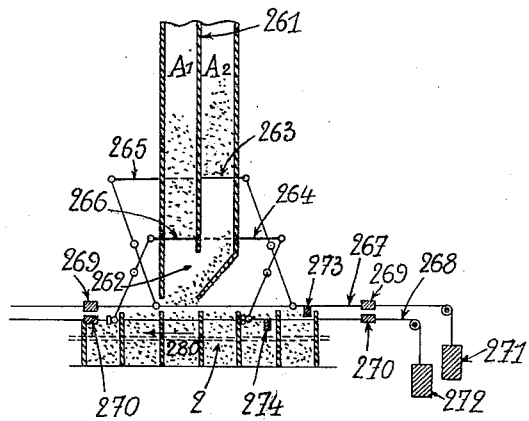
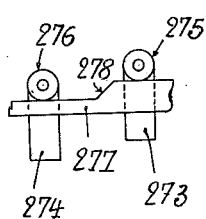
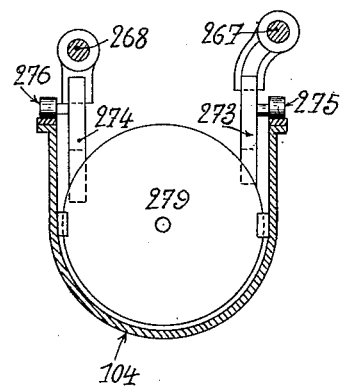
INVENTOR:
André Olier
BY: Ruegg, Bayer & Bakelan
ATTORNEYS.

Patented Nov. 17, 1931

1,832,472

UNITED STATES PATENT OFFICE

ANDRÉ OLIER, OF CLERMONT-FERRAND, FRANCE, ASSIGNOR TO SOCIETE ANONYME DES ETABLISSEMENTS A. OLIER, OF CLERMONT-FERRAND, FRANCE

AUTOMATIC APPARATUS FOR THE CONTINUOUS EXTRACTION OF THE SUGAR CONTAINED IN SUGAR PLANTS

Application filed February 18, 1928, Serial No. 255,282, and in France March 8, 1927.

The present invention relates to improvements in apparatus for the continuous diffusion treatment of sugar plants, and more generally of all substances adapted to furnish products soluble in the liquid employed, whether by lixiviation, washing, diffusion or like continuous and systematic operations.

The improvements according to the present invention are particularly adapted to render the apparatus automatic in such manner that it will stop automatically if the raw material such as beets (or like solid material) or the extracting liquid, should be lacking, and that it will automatically start in operation when the raw material is again normally supplied. Due to such automatic action, I am further enabled to modify the functioning of the apparatus according to the variations of output, density, temperature, and the like, of the liquid issuing from the apparatus.

It is a known fact that the regular operation of the apparatus requires a preliminary determination of the relative outputs of material to be exhausted and the exhausting liquid. In the particular case of the diffusion for the extraction of sugar, it is impossible to obtain a constant proportion of the sugar juice extracted as well as the total exhaustion of the pulp, unless the proportion between these two factors, substance and liquid, remains constant, as well as the duration of contact and the temperature.

The apparatus according to the present invention is adapted for the automatic regulation of these different factors.

In one of my improvements, the hopper for the supply of the sliced beets or other solid material to be exhausted comprises a fluid-tight double wall or jacket and is suspended by a counterweight in such manner that its position of equilibrium depends upon the level of the beets in the hopper and upon the level of the liquid in the double wall or jacket of the hopper. The hopper thus suspended is suitably connected with the device controlling the motor driving the conveyor which supplies the material to the diffusion apparatus, and also with the steam valves for the heating, and with the cock at the outlet of the liquid from the apparatus. In this manner, should the feeding of the beets into the hopper be stopped, this will be shown by a stopping of the conveyor and at the same time by a variation of the output of the exhausting liquid, of the temperature and of the discharge of liquid from the apparatus.

According to another feature of the invention, the beets or other solid material to be exhausted are supplied to the apparatus by means of slidable gauging or measuring devices, whereby a uniform feed of the material upon the endless conveyor will be obtained.

To assure the uniformity of the static charge of the liquid and hence the continuous discharge of the sugar juice from the apparatus, I prefer to employ a tank for regulating the static load, this being provided with a float acting upon a cock for the supply of the exhausting liquid. I may also employ a densimeter and a thermo-regulator, both mounted at the exit of the juice, thus acting upon the output of the liquid from the apparatus and the supply of heating steam.

The said apparatus may further comprise an automatic system for the tension of the chains or cables comprised in the said conveyor.

The appended diagrammatic drawings show by way of example a plant according to the present invention.

Fig. 3 is a perspective view of a measuring and feeding device.

Fig. 4 is an elevational view showing diagrammatically and in vertical section a modification of the said measuring and feeding device.

Fig. 5 is an enlarged cross-section through the upper horizontal part of the diffusing apparatus and Fig. 6 is a diagram showing a detail of the means for actuating the measuring and feeding device.

Figure 1:
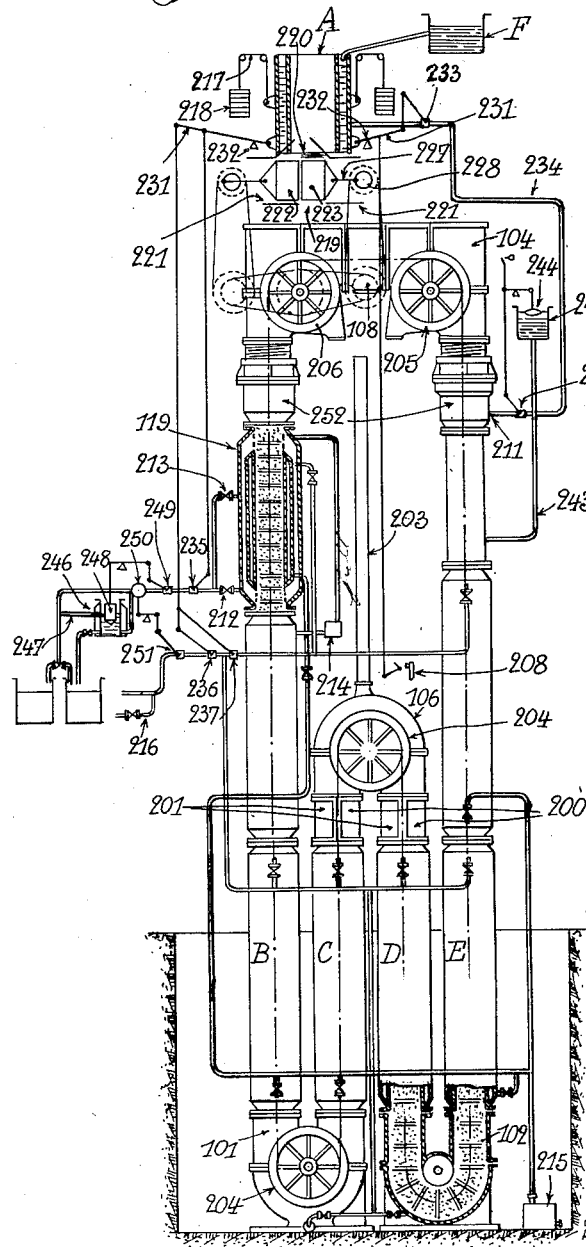
Fig. 1 is an elevational view of the plant, partially in section.
Figure 2:
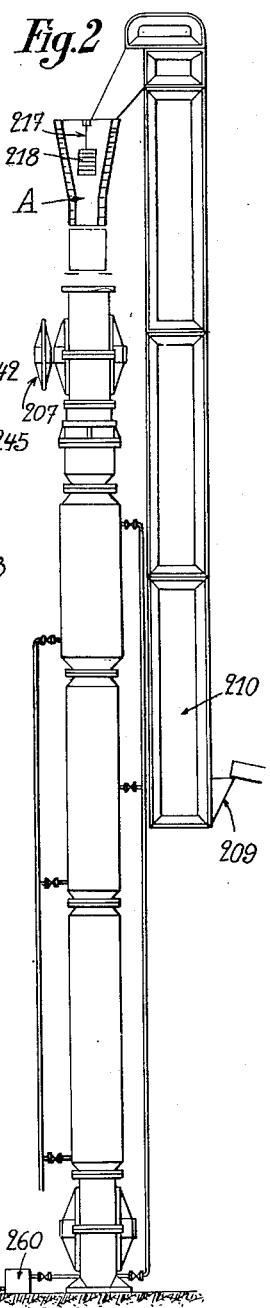
Fig. 2 is the corresponding side view.

The diffusing apparatus comprises a plurality of vertical chambers or columns B—C—D—E made for instance of sheet steel, and having single or double walls for heating purposes. The said columns are connected together at the lower part by the cast iron bases 101—102 and the casings 104—106 join them together in pairs at the upper part. It is supposed in the drawings that the apparatus comprises four columns, the two middle columns having a less height than the others. The casing 106 has preferably the removable parts 200—201, for inspection and repairs; it also comprises a stack 203 for the evacuation of the gas driven over with the material and disengaged by the heating. The conveyor moves horizontally in the upper casing 104 which comprises an offtake 108 for the exhausted pulp. In the casings 101—106—102 are mounted the loose wheels 204 coacting with the chain or cable of the coneveyor, and the upper casing is provided with a loose wheel 205 adjacent the outlet column E for the exhaust-pulp, and a driving wheel 206 actuated by a pinion 207 adjacent the beet inlet column B. The driving pinion 207 is actuated by a speed-reducing device (not shown) driven by a motor whose supply switch is shown diagrammatically at 208.

The conveyor comprises a central cable, or a pair of side chains or cables, and suitable plates or brackets, and preferably perforated plates. The pieces of beets from the cutting machine (not shown) are brought to the bottom 209 of an elevating device 210 which pours the beets into the feeding hopper A. The beets proceed thence to the top, between the plates of the conveyor, and pass successively through the columns B—C—D—E, being then evacuated through the outlet 108.

The exhausting liquid contained in a pressure tank F enters the pulp offtake column E at 211, descends gradually in this column while becoming richer in sugar, and is finally discharged at a point near the top of the beet inlet column B. The apparatus comprises two outlets 212—213 for the sugar juice which are placed at different levels so that the liquid can be discharged notwithstanding any possible variations of the permeability or the resistance to the outflow accorded by the pieces of beets which are cut in larger or smaller sizes, or are badly cut or come from defective beets, whether frozen or decayed, on the plates of the conveyor.

To facilitate the diffusion of the pieces, it is preferable to heat or scald them before placing them in contact with the hot sugar juice issuing from the apparatus, for instance by means of a heating device 119 of any suitable type, in which one of the elements of the column B is a triple envelope to permit the heating of the juice through the intermediary of a pump 214.

The heating medium may be steam (steam from exhaust or withdrawn steam) and an automatic emptying device 215 is provided for the condensed steam. An emptying pump 260 is placed in the pit when the lower part of the apparatus is situated below ground.

The figures also show the pipes 216 for the admission of live steam serving to start the plant in case there is no exhaust steam available.

According to one important feature of the invention, the hopper A for feeding the beets has a double wall; it is freely hung from the ends of the cables 217 which are provided with the counterweight 218. The said hopper, which has the form of a rectangular parallelepipedon, is relatively narrow and flares at the upper part; at the lower part it has an aperture 219 above which is mounted a horizontal partition 220 of corresponding width. The bottom of said hopper is laterally extended at 221 so as to guide the motion of two sliding elements 222—223 in symmetrical disposition. Each element may consist of two small parallel plates (Fig. 3) 224—225 connected by small rods 226; the outer plate 225 of each element is connected by a link 227 with an eccentric or crank 228; both cranks are driven by the motor of the conveyor, so that the mechanism will operate in synchronism. Each sliding element causes the synchronous motion of sets of bars forming gratings; one set 229 is placed horizontally at the exterior and the other set 230 is inclined from the vertical towards the interior. Herein it is supposed that the gratings are mounted directly upon the said sliding elements, but they might be separately secured and can be actuated directly by crank and rod, moving in separate guides. Under the effect of the rotation of eccentrics or cranks, the sliding elements 222—223 will move in a straight path: herein the left hand element is filled with beets, and the bars 229 of the right hand sliding element closes up the space between the horizontal wall 220 and the right hand vertical wall of the hopper. When moving to the right, the inclined bars 230 secured to the left hand sliding element mellow the mass of beets in such manner as to prevent agglomeration of the beets and break down the clogged parts. The left hand sliding element proceeds gradually under the horizontal wall 220, and the beets fall from the element 222 upon the conveyor through the aperture 219. During this time, the horizontal bars 229 of the element 222 successively close up the space between the horizontal wall 220 and the left hand vertical wall. At the same time, the element 223 moves to the right, the horizontal bars 229 extend outwardly, and the upper inclined bars mellow the mass of beets. In this motion, the element 223 becomes filled with beets. At the end of the stroke of the sliding elements to the right, the element 223 now becomes filled, and the element 222 is entirely emptied.

This system of sliding elements allows of an exact adjustment of the output of the beets traversing the apparatus, while at the same time the beets can be piled between the conveyor plates in a compact manner, thus offering a more regular resistance of the beets to the flow of the liquid and a more uniform time of contact with the raw material.

Figs. 4, 5 and 6 show a modification of the said slidable system of measuring elements which also possesses the aforesaid advantages. In this device, which is given by way of example, the hopper A is divided into two chambers of practically the same size $A_1$—$A_2$ by a vertical partition 261, cut away at the lower part at 262 to afford communication between the two chambers $A_1$ and $A_2$. Each chamber may be closed at the bottom by two plates or registers 263—264—265—266, passing through suitable apertures in the sides of the chambers $A_1$ and $A_2$. The registers may have the form of gratings, as in Fig. 3, and they are actuated in such manner that when the upper register 265 of the chamber $A_1$ is open, the lower register 266 of the same chamber will be closed; a like movement takes place at the same time in the chamber $A_2$, but alternated with that of the registers in $A_1$, i. e. the opening of the upper register 265 of $A_1$ coincides with the closing of the upper register 263 of $A_2$, and the same is true for the two lower registers.

In this manner, for an alternating period of the four registers, the same amount of material will always be dropped between the plates through the opening 219, which quantity will be measured by the space comprised between the upper and the lower register.

An example of the control for this alternate and periodic motion of the four registers is shown in Figs. 4 to 6: in these figures, 279 indicates the plates of the endless conveyor which are connected together by the flexible band 2. The registers are connected by suitable rod-and-link gear with two rods 267—268 slidable in the bearings 269—270, and said rods are urged toward the extreme position of equilibrium by springs or weights 271—272. Each rod carries an arm 273—274 (Fig. 6), and each arm coacts with a roller 275—276 operating upon a roller race 277 having an inclined part 278. With the arm 273 for instance at a suitable point of the casing 104 with which the rod 273 is parallel, and in a position such that its roller 275 is at the bottom of the ramp 278, the plate 279, which is one of the plates of the endless conveyor and moves in the casing 104 according to the arrow 280, will meet the said arm and move it forward, obliging its roller to rise on the ramp 278 against the weight 271. When the roller 275 is at the top of the ramp, the arm 273 will be entirely out of the path of the plate 279 which travels forward, but herein the said weight draws back the roller 275 to the bottom of the ramp and into contact with the succeeding plate, and so on. The alternate motion of the second arm 274 is quite the same as described.

A suitable choice may be made of the length of the said arms, and of the position of the ramps and of the arms around the plate in order to accurately regulate the motion of the measuring registers 263—264—265—266.

In order that the diffusion shall take place in the proper manner, i. e. that the juice shall have the proper percentage of sugar, it is necessary, as above stated, that the proportions of the substances employed, whether solid or liquid, and the duration of contact, shall be constant. Should the hopper become empty due to stoppage of the beet cutter or for like reasons, it is essential that the apparatus should stop, and that the exhausting liquid be cut off. At the same time, it is required to avoid lowering the level of the said liquid in the right hand column, and for this reason the discharge of the juice must be stopped. The heating must also be stopped in order to prevent all excessive heating of the beets. These different operations are performed automatically, due to the arrangement of the hopper with the counterweight. For this purpose, upon the hopper are mounted a certain number of levers 231 pivoted on fixed axles or knife edges 232 and connected by cables, chains, levers or the like with the parts which will be further specified.

The first of these parts is the switch 208 controlling the supply circuit of the electric motor driving the endless conveyor. This part might consist of the steam cock for the cylinders of an engine, or any other part controlling a motor.

It has been supposed that one of the levers controls a valve 237 for the free exit of the steam from the apparatus when this is automatically stopped. It is necessary in this latter case, in fact, to discharge the steam from the apparatus to avoid the prejudice due to a long heating of the beets.

In normal conditions, the beets will have a practically constant level, due to the adjustment of the conveyor 210. Should this level be lowered by any reason, such as the stopping of a conveyor, or of the beet cutter, or the like, the hopper A will rise by the effect of the weight 218. The following effects will thus be produced at the same time; the exhausting liquid will be cut off;—the conveyor will be stopped by the opening of the switch 208;—the exit of the juice will be stopped at 235;—the admission of heating steam is stopped at 236;—the apparatus is connected with the atmosphere at 237 to discharge the steam therefrom. If the level of the beets in the hopper rises, due to an excessive feed from the supply apparatus, or from like causes, the hopper will rest upon the upper part of the casing 104 and will be without effect upon the several parts above enumerated. The beets may overflow from the hopper, so that the workmen are warned and can thus stop the feeding apparatus.

Obviously, the displacements of the hopper may act only upon a certain number of the aforesaid parts of the apparatus, and for instance solely upon the admission of the exhausting liquid and upon the travel of the conveyor.

According to another characteristic of the invention, which is of some importance, the hopper serves both for the supply of the beets and of the water. For this purpose, the hopper has double walls of a watertight construction, and the space between the said walls is connected by flexible hose firstly with the feeding tank F and secondly with the column E by the cock 245.

In this manner the exhausting liquid coming from the tank F and entering the column E at 211 will flow through the jacket which surrounds the feeding hopper. The capacities of the jacket and of the compartment for the beets are such that they will contain equal weights of beets and of liquid when filled up and the counterweights 218 are somewhat heavier than the jacketed hopper with either the compartment for the beets filled and the jacket deprived from liquid or vice versa. With such an arrangement, the said jacketed hopper will rise when either the compartment for the beets or the jacket becomes empty and will thus control the whole apparatus in the same way in both cases where exhausting liquid or beets are lacking.

To assure the uniform discharge of the exhausting liquid and the immersion of the beets to a well-determined level in the column E, it is preferable to use a regulator for static load or pressure consisting of a vessel 242 connected with the column E by the pipe 243. The level of the liquid in this vessel is practically proportional to the height of the liquid in the column E, so that if the level falls, the float 244 which is connected by a set of levers to a cock 245 on the feeding pipe 234 will open this cock to obtain a greater feed of the liquid, so as to again establish the static load.

I prefer to place at the outlet of the juice, and branched on the discharge pipe, a densimeter 246 of the doublewalled type in which a fluid is circulated at a contact temperature. The densimeter is provided with an overflow 247, so that its level will remain constant; the float 248 of the desimeter is connected by rod and link gear to a cock 249 on the outlet pipe for the juice. According to the variations of density of the juice discharged from the apparatus, the said float will actuate the cock, thus varying the outflow of the juice.

If the juice is not sufficiently strong in sugar, because it has not remained long enough in contact with the beets, the float 248 descends and slightly closes the cock 249, thus reducing the output of juice from the apparatus and hence increasing the time of contact of the juice and the beets. The densimeter is placed in by-pass, so that it will not be obliged to cool the whole mass of the juice, which latter must be subsequently heated in order to concentrate it.

To obtain a constant temperature of the liquid, I may use a thermo-regulator 250 at the outlet of the juice; said regulator may be of a type known per se, such as a thermostat of the dilatation type, connected by a set of levers, links or the like, with a cock 251 for the supply of heating steam. If the temperature of the juice discharged from the apparatus is too low, the said thermo-regulator will act upon the steam cock to increase the supply of steam.

For the proper functioning of the apparatus, the chains or cables of the conveyor must be constantly stretched, and I obtain this result by mounting the upper casing 104 on the two end columns B—E by means of the sliding joint or packing arrangement 252 comprising a stuffing-box.

Obviously, the invention is not strictly limited to the details of construction herein specified by way of example and the apparatus is susceptible of numerous modifications without departing from the spirit of the invention.

Having now described my invention, what I claim as new and desire to secure by Letters Patent is:

1. An apparatus for the continuous treatment of solid materials by contact with liquids comprising in combination a substantially tight and tubular body, an endless conveyor movable in said body, power means for driving said conveyor, means for circulating a liquid through said body, means for supplying the solid material, means for discharging the solid material, and means associated with said liquid circulating means for controlling the driving of said conveyor in response to the rate of circulation of the liquid.

2. An apparatus for the continuous treatment of solid materials by contact with liquids comprising in combination a substantially tight and tubular body, an endless conveyor movable in said body, power means for driving said conveyor, means for circulating a liquid through said body, means for supplying the solid material, means for discharging the solid material, automatic means associated with said supplying means for controlling the driving of said conveyor, means for heating the solid material, and means associated with said automatic means, for controlling said heating means both controls in response to the rate of supply of the solid material.

3. An apparatus for the continuous treatment of solid materials by contact with liquids comprising in combination a substantially tight and tubular body, an endless conveyor movable in said body, power means for driving said conveyor, means for circulating a liquid through said body, means for supplying the solid material, means for discharging the solid material and means responsive to the head of liquid in said body for controlling said liquid circulating means.

4. An apparatus for the continuous treatment of solid materials by contact with liquids comprising in combination a substantially tight and tubular body, an endless conveyor, movable in said body, power means for driving said conveyor, a solid material feeding hopper suspended above the solid material inlet of said body and adapted to assume a variable position depending on the weight of material contained therein, means for discharging the solid material, and means for operatively connecting said hopper with means adapted to control the driving of said conveyor.

5. In the combination claimed in claim 4, the provision of a receptacle suspended with said hopper and included in the liquid circuit.

6. An apparatus for the continuous treatment of solid materials by contact with liquids comprising in combination a substantially tight and tubular body, an endless conveyor movable in said body, power means for driving said conveyor, means for circulating a liquid through said body, a solid material feeding hopper surrounded with a jacket, said jacket being included in the liquid circuit, said hopper being suspended above the solid material inlet of said body and adapted to assume a variable position depending on the weight of material in said hopper and jacket, means for discharging the solid material from said body and means, operatively connected with said hopper, for controlling said liquid circulating means.

7. In the combination claimed in claim 4, the provision of heating means embodying steam conduits and control valves thereon, and means for operatively connecting said hopper with said control valves.

8. In the combination claimed in claim 4, the provision of means at the outlet of said hopper, for controlling the supply of solid material to said body, and means for actuating said supply controlling means in time relation with the displacement of said conveyor.

9. In the combination claimed in claim 4, the provision of two superposed obturating members above the outlet of said hopper, for controlling the supply of solid material to said body, and means for actuating said supply controlling means in time relation with the displacement of said conveyor.

10. In the combination claimed in claim 4, the provision of two distributers, at the outlet of said hopper for controlling the supply of solid material to said body, and means for alternately actuating said distributers in time relation with the displacement of said conveyor.

11. An apparatus for the continuous treatment of solid materials by contact with liquids comprising in combination a substantially tight and tubular body, an endless conveyor movable in said body and comprising equally spaced transverse members attached to flexible endless means, means for circulating a liquid through said body, a solid material feeding hopper and means for discharging the solid material from said body, said hopper having a distributer at its outlet, and means for actuating said distributer, comprising an axially movable rod substantially parallel with the part of the conveyor adjacent said hopper, a tappet in the path of said transverse members, a finger on said rod projecting in the path of said tappet forwardly of the same in the direction of motion of the conveyor, a cam surface cooperating with said tappet for moving the latter out of the path of said transverse members after a given displacement of said tappet, and means for urging said rod in a direction reverse to the displacement of said conveyor.

12. In the combination claimed in claim 4, the provision of an obturating member periodically movable above the outlet of said hopper and means, associated with said obturating member for mellowing the clogged material above said obturating member.

13. An apparatus for the continuous treatment of solid materials by contact with liquids comprising in combination a substantially tight and tubular body, an endless conveyor movable in such body, power means for driving said conveyor, means for supplying a liquid to said body, means for discharging liquid from said body, means for supplying the solid material, means for discharging the solid material, means associated with said solid material supplying means for controlling said liquid supply means in response to the rate of supply of the solid material, means for heating the liquid, a receptacle by-passing the liquid discharging means, an overflow pipe in said receptacle, a jacket adapted to be supplied with a cooling fluid at a constant temperature, and a density controlling float in said receptacle for controlling said liquid discharging means.

14. An apparatus for the continuous treatment of solid materials by contact with liquids comprising in combination a substantially tight body, a conveyor within said body for conveying therethrough the solid material, power means for driving said conveyor, means for circulating a liquid through said body, means for supplying the solid material, means for discharging the solid material and means for automatically stopping said conveyor incident to a stopping in the feeding into said body of any one of the two essential elements, solid material and liquid.

15. In an apparatus as claimed in claim 14, the further feature residing in that said automatic means are further adapted to automatically start again the conveyor incident to a restarting in the feeding of the failing element into the body.

16. In an apparatus as claimed in claim 14, the provision of means responsive to said automatic means for automatically stopping the feeding into the body of the non failing element.

17. An apparatus for the continuous treatment of solid materials by contact with liquids comprising in combination a substantially tight body, a conveyor movable in said body, power means for driving said conveyor, means for circulating a liquid through said body, means for supplying the solid material, means for discharging the solid material, automatic means adapted to stop said conveyor incident to a stopping in the feeding into said body of one at least of the two essential elements, solid material and liquid, said automatic means being further adapted to start again said conveyor incident to a restarting in the feeding of the body in the failing element, and means responsive to said automatic means for automatically stopping the feeding into the body of the non failing element and starting it again simultaneously with the stopping and starting of the conveyor.

18. An apparatus for the continuous treatment of solid materials by contact with liquids comprising in combination a substantially tight body, a conveyor movable in such body, power means for driving said conveyor, means for supplying a liquid to said body, means for discharging liquid from said body, means for supplying the solid material, means for discharging the solid material, means for heating the body, means for automatically stopping said conveyor incident to a stopping in the feeding into said body of one at least of the two essential elements, solid material and liquid, said automatic means being further adapted to start again said conveyor incident to a restarting in the feeding into the body of the failing element and separate means responsive to said automatic means for automatically stopping the feeding into the body of the non failing element, the heating of the body, the discharge of the liquid from the body, respectively, and starting again the same, stopping and starting being effected simultaneously with the stopping and starting of the conveyor, respectively.

19. An apparatus for the continuous treatment of solid materials by contact with liquids comprising in combination a substantially tight body, a conveyor within said body for conveying therethrough the solid material, power means for driving said conveyor, means for circulating a liquid through said body, means for supplying the solid material, means for discharging the solid materi.... and means for automatically stopping r 'd conveyor incident to a stopping in the feed.. ,r into said body of one of the two essential elements, solid material and liquid and to automatically start again the conveyor incident to a restarting of the feeding of the failing element.

20. An apparatus for the continuous treatment of solid materials by contact with liquids comprising in combination a substantially tight body, a conveyor within said body for conveying therethrough the solid material, power means for driving said conveyor, means for circulating a liquid through said body, means for supplying the solid material, means for discharging the solid material, means for automatically stopping said conveyor incident to a stopping in the feeding into said body of one of the two essential elements, solid material and liquid and means responsive to said automatic means for automatically stopping the feeding into the body of the non failing element.

21. In an apparatus for the continuous treatment of solid materials by contact with liquids comprising in combination a substantially tight body having an inlet for the supply thereinto of solid material, means within said body for conveying therethrough the solid material, means for circulating a liquid through said body, and various separate means for controlling the operation of said apparatus, the provision of a solid material feeding hopper suspended above the solid material inlet of said body and adapted to assume a variable position depending on the weight of material contained therein, and means for operatively connecting said hopper with at least one of said controlling means.

22. In an apparatus for the continuous treatment of solid materials by contact with liquids comprising in combination a substantially tight body having an inlet for the supply thereinto of solid material, means within said body for conveying therethrough the solid material, means for circulating a liquid through said body, and various separate means for controlling the operation of said apparatus, the provision of a solid material feeding hopper suspended above the solid material inlet of said body and a receptacle suspended with said hopper, said receptacle being adapted to be passed through by the liquid before entering said body, hopper and receptacle being further so suspended as to be able of assuming a variable position depending on the total weight of solid material and liquid contained therein and means for operatively connecting said hopper with at least one of said controlling means.

23. In an apparatus as claimed in claim 22, the further feature residing in that said receptacle is constituted by a jacket surrounding the solid material feeding hopper.

24. In an apparatus as claimed in claim 22, the further feature residing in that the capacities of said receptacle and hopper are such that hopper and receptacle, when full, will contain substantially equal weights of solid material and liquid respectively.

25. In an apparatus as claimed in claim 21, the further feature residing in that means constantly urge said hopper upwardly and are such that they develop a substantially constant thrust on the hopper whatever may be the position of the latter, whereby said hopper may assume only two different positions, said means being further so proportionated that the thrust on the hopper will be at least sufficient to raise the latter when empty.

26. In an apparatus as claimed in claim 22, the further feature residing in that the capacities of said receptacle and hopper are such that hopper and receptacles, when full, will contain substantially equal weights of solid material and liquid, respectively, and that means constantly urge said hopper upwardly and are such that they develop a substantially constant thrust on the hopper whatever may be the position of the latter, whereby said hopper may assume only two different positions, said means being further so proportionated that the thrust on the hopper will be at least sufficient to raise the latter together with the receptacle when either the receptacle or the hopper becomes empty.

In testimony whereof I have signed my name to this specification.

ANDRÉ OLIER.